United States Patent [19]

Tenhunen

[11] 4,058,038
[45] Nov. 15, 1977

[54] APPARATUS FOR DETACHING A PORTION OF A BODY OF MATERIAL SUCH AS HAY

[76] Inventor: Lauri Alarik Tenhunen, 74700 Kiuruvesi, Finland

[21] Appl. No.: 666,141

[22] Filed: Mar. 11, 1976

[30] Foreign Application Priority Data

June 2, 1975 Finland ............................... 1617/75
July 18, 1975 Finland ............................... 2087/75

[51] Int. Cl.² ............................................. B26D 5/12
[52] U.S. Cl. ...................................... 83/109; 83/523;
83/928; 30/379; 83/639
[58] Field of Search ........................ 83/928, 523, 109;
30/379, 388

[56] References Cited

U.S. PATENT DOCUMENTS 3,517,711  6/1970  Reeser et al. ...................... 83/928 X

FOREIGN PATENT DOCUMENTS 242,683  1/1963  Australia ................................ 30/379

Primary Examiner—Willie G. Abercrombie
Attorney, Agent, or Firm—Steinberg & Blake

[57] ABSTRACT

An apparatus capable of detaching from a body of a material such as hay a portion thereof which then can be transported to a desired location. A prime mover such as a tractor carries at one of its ends, for example, a frame which supports a cutting structure capable of cutting into a body of a material such as hay in such a way as to carry out a slicing action while cutting into the body, so as to detach from the body a portion thereof which then can be transported to a desired location.

17 Claims, 9 Drawing Figures

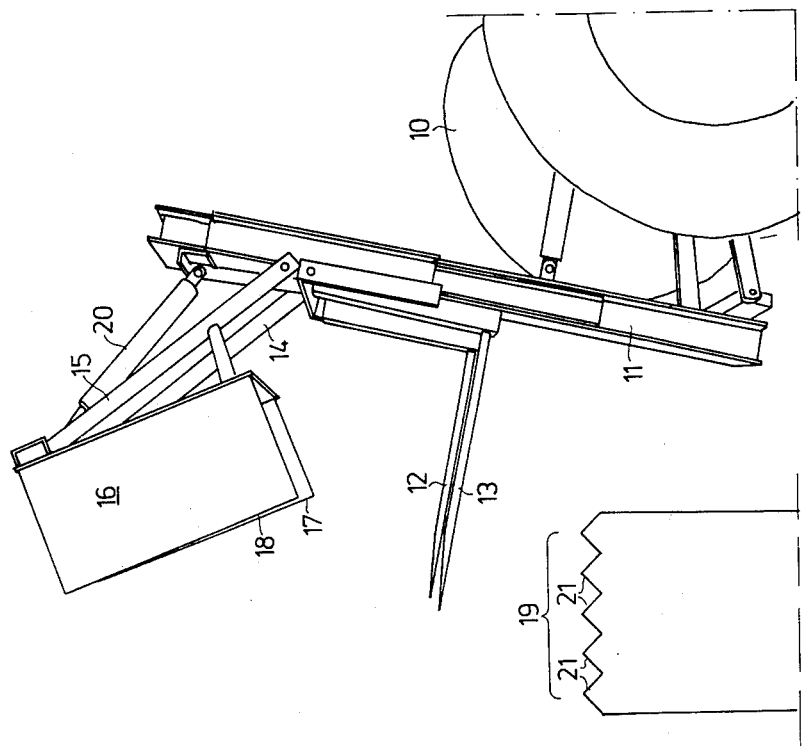
FIG. 4
FIG. 5
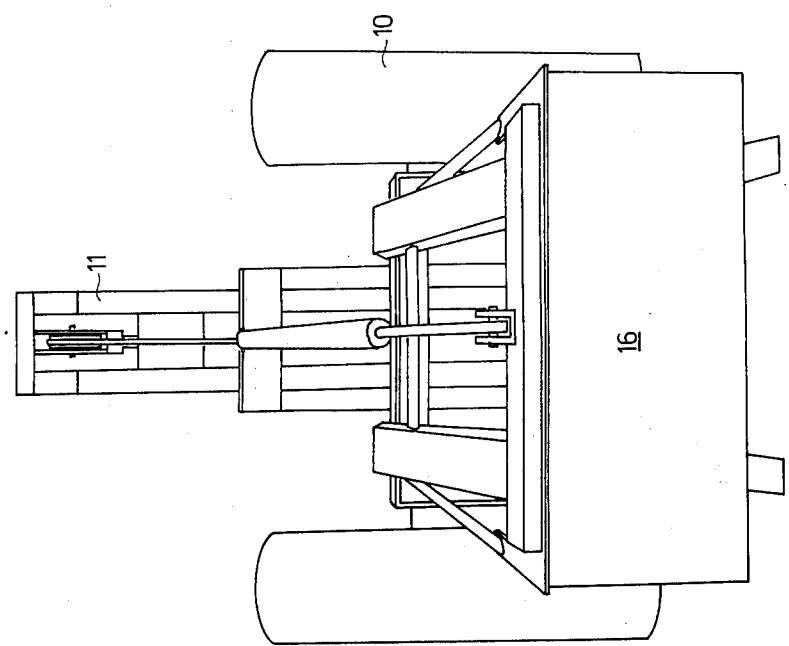
FIG. 3

APPARATUS FOR DETACHING A PORTION OF A BODY OF MATERIAL SUCH AS HAY

BACKGROUND OF THE INVENTION

The present invention relates to cutting apparatus.

In particular, the present invention relates to that type of cutting apparatus which is capable of detaching from a body, such as a body of hay, a portion thereof in the form of an edible block of food, for example, which after detachment from the body can readily be transported to a desired location.

As is well known, succulent edible food such as green food may be protected against deterioration by a suitable preserving agent, and may consist primarily of a raw material such as fresh hay which may be packed and compressed to form a highly compact mass situated, for example, in silos or in outdoor beds. Separation of portions of this food from the mass thereof within a silo, for example, and transportation of the detached portion to cattle or into a manger platform for feeding cattle creates serious problems particularly in cattle farms and especially in those countries where livestock husbandry is practiced. Up to the present time there has no satisfactory solution to this problem, and attempts to solve the problem have given rise very noticeably to changes in production in animal husbandry and in fact to abolishment of cattle stock as a result of the heavy and unattractive work involved. In a country such as Finland which has an extremely short summer, the northerly location of the country and the nature thereof impose serious limitations on producing of cattle which is to form part of the food consumed by the population, and at the present time there are no economically acceptable methods for producing such food. For example, in the case of highly compacted hay or other similar types of food, detachment of portions thereof requires the use of numerous different types of working implements and procedures. It is known to utilize for such purposes, for example, various types of saws, spiked claw-like tearing implements, milling heads, gantry cranes, block and tackle units, and the like. The drawback of all such devices resides in their high cost and in their limited, one-sided service characteristics. It is also to be noted that with known apparatus and methods the edible product is undesirably loosened as it is detached from the compact body, so that the storage quality of such a detached edible product in an intermediate location to serve for consumption during an interval of one or two days is seriously impaired, as is also the case in a silo, with the food reaching rapidly a deteriorating condition under fermentation. It is rarely possible to carry out such a food-detaching operation in a manner which will involve immediate transportation after detachment to a manger. It is therefore frequently necessary to bring about transport of the food to the manger by way of strenuous manual labor. With the prior art apparatus and with the conventional locations of the stored food, it is often essential to provide preparations for food detaching operations prior to actual feeding times which take place twice each day.

Because of the above situation with respect to the handling of edible products in cattle husbandry, silos and livestock buildings cannot be designed so as to have unitary service characteristics. Attempts have recently been made to solve these problems encountered in animal husbandry, but up to the present time satisfactory solutions have not been found. Farmers and advisory organizations have set for themselves the aim of achieving detachment of food from within a silo by cutting procedures, which would be the best solution with respect to maintaining the quality of the food, and which also would be a most economical solution. Detachment of such succulent edible food by cutting is at the present time carried out by using sharpened shovels, saws, or manually operated strikers. However, these implements are also encumbered by numerous drawbacks. In the first place, the food-cutting operations involve slow and cumbersome work, and the cut portion of the food must be lifted either by hand or by aid of a suitable hoisting apparatus, after which the detached food still must be conveyed to the manger either manually or by way of additional equipment.

SUMMARY OF THE INVENTION

It is accordingly a primary object of the present invention to provide an apparatus which will avoid the above drawbacks.

In particular, it is an object of the present apparatus to provide an apparatus of relatively low initial cost and low operating cost which can be readily attached to machines already in existence on a farm for other purposes and which are capable of effectively detaching from a body such as hay, a portion thereof to be readily transported to a location for consumption.

It is furthermore an object of the present invention to provide an apparatus for detaching a portion of a body of food or the like in such a way that all of the required operations such as detaching a portion of the body, lifting of the detached portion, and transportation thereof to a manger can be carried out with one and the same unit.

It is also an object of the present invention to provide an apparatus of the above type which can maintain the detached portion of the food in such a way that it can remain at the location where it has been transported in a condition of good quality, without deterioration even after a period of one or two days.

According to the invention the apparatus includes a prime mover, such as a tractor, carrying a frame means which in turn carries a cutting means which operates to detach from a body a portion thereof while carrying out a slicing cut with respect to the body.

BRIEF DESCRIPTION OF DRAWINGS

The invention is illustrated by way of example in the accompanying drawings which form part of this application and in which:

FIG. 3 is an elevation of the structure of FIGS. 1 and 2 shown at the end of a cutting operation;

FIG. 4 shows the structure of FIG. 1 in a tilted attitude;

FIG. 5 illustrates a cutting edge of a part of the cutting means of FIGS. 1-4;

DESCRIPTION OF PREFERRED EMBODIMENTS

Figure 2:
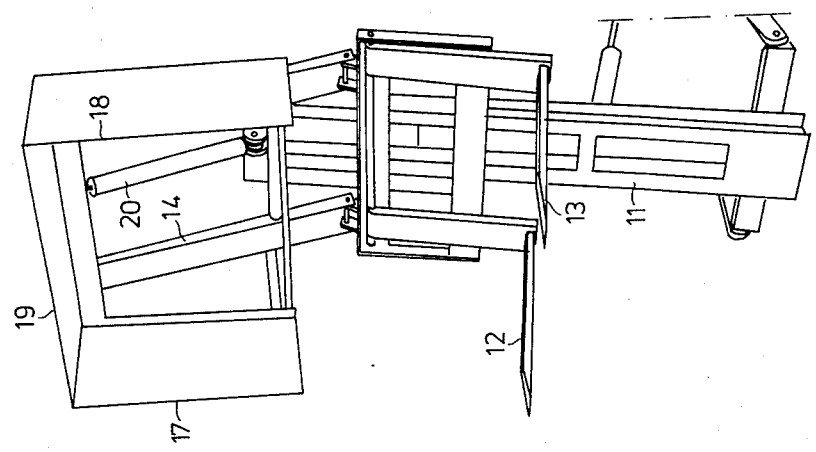
FIG. 2 is a perspective illustration of the structure of FIG. 1 as seen from the left of FIG. 1.

Referring to FIGS. 1-5, the embodiment of the invention illustrated therein has a prime mover 10 which is fragmentarily illustrated and which forms the power source for the apparatus of the invention, this prime mover 10 being an agricultural tractor in the illustrated example. The tractor 10 has a frame means 11 connected thereto, this frame means forming a basic machine and in the illustrated example taking the form of a fork-lift device which in itself is well known. Of course, the cutting means of the invention may also be carried by a body structure specifically designed for this purpose, or the frame means may take the form of a front or rear loader.

The frame means 11 is illustrated in a condition where it has been attached to the three-point lifting structure of the tractor 10, and with this structure it is possible to tilt the frame means 11 so that it may, for example, be tilted with respect to the vertical as illustrated in FIG. 4. The fork-lift device 11 has a pair of prongs 12 and 13 similar to conventional fork-lift prongs but having special cutting edges at their free ends, as will be apparent from the description below. These prongs 12 and 13 of course may be raised to a desired height in a well known manner.

The prongs 12 and 13 may be considered as forming part of the cutting means of the invention which further includes an upper cutting unit 16 pivotally connected to the frame means 11 by way of a pair of arms 14 and 15. Thus these arms 14 and 15 are pivotally connected at their right free ends to the frame means 11, as viewed in FIG. 1, while at their left free ends they are fixed to the unit 16. This unit 16 has a wall structure including a pair of opposed side walls terminating in lateral cutting edges 17 and 18, and these side walls are interconnected by a transverse wall of the wall structure terminating in the front cutting edge 19.

The cutting means further includes a hydraulic actuating means 20 which actuates the cutting means by swinging the unit 16 about the pivot axis provided by way of the connection of the arms 14 and 15 to the frame means 11. This hydraulic unit 20 is a well known piston-and-cylinder assembly connected at one end to the unit 16 and at its opposite end to the frame means 11 while being supplied in a well known manner with pressure oil as controlled by the operator of the tractor 10.

In order to operate this embodiment of the invention, the structure initially has a position as illustrated in FIG. 2. With the structure in this position the tractor 10 is backed toward the body such as a body of compacted hay, and as a result the prongs 11 and 12 are pushed into the body, penetrating into the same. The hydraulic actuating means 20 of the cutting means is then expanded so as to swing the unit 16 downwardly around the pivot axis provided by the connection of the arms 14 and 15 to the frame means 11. As a result the cutting edges 17-19 cut into the body in order to take a bite therefrom, and after the unit 16 has been lowered, for example to the position indicated in FIG. 3, the prongs 12 and 13 are raised so that the cutting means defines at the interior of the unit 16 a space for containing and determining at least in part the configuration of a block of detached food in compacted form as a result of the compression thereof into the space defined by the walls which have the edges 17-19 by way of the raised prongs 12 and 13. Thus, the separated portion of the body of hay or the like is now maintained compactly within the unit 16 and supported by the prongs 12 and 13, and in this condition the tractor may be driven so as to transport the removed portion to a desired location.

The fork-lift device 11 utilized in this particular embodiment is a favorable type of basic machine to be used with the invention in that it may readily be used to detach and carry off a relatively large amount of food which may have a height of 2.5 m, although it is to be understood, as pointed out above, that other types of basic machines differing from lifting forks may be utilized as well.

One of the important characteristics of the invention resides in the fact that the cutting means of the invention carries out a slicing action while cutting into the body to detach a portion thereof. This is distinct from an anvil type of cutting action where the cutting edge is simply pushed into a body without any slicing action taking place. The cutting edges 17 and 18 of the cutting unit 16 perform a slicing cut inasmuch as they meet the body of edible product at a slant when the cutting unit 16 is initially pressed against the food mass by the hydraulic actuating unit 20, and then during the downward turning of the unit 16 these edges 17 and 18 slide or move longitudinally with respect to the food mass so as to provide the slicing action, bringing about in this way an extremely effective cutting. In order to enhance the cutting action achieved by way of the front edge 19 of the unit 16, this front edge 19 preferably has an irregular configuration. For example it may be stepped as by being in the form of a serated edge 21 as illustrated in FIG. 5. It is also possible simply to provide the cutting edge 19 in the form of suitable notches. While the front cutting edge may of course be straight, this latter type of construction is not as advantageous as a construction of the type illustrated in FIG. 5 which will produce a slicing cut.

It is to be noted that the cutting unit 16 can rapidly and easily be dismounted from the fork-lift device 11. This requires only detachment of the arms 14 and 15 and the unit 20 from the device 11. After this part of the cutting means has been disassembled from the device 11, this device constituting the basic machine may be used for other types of work. It is furthermore possible to attach to the structure of the invention as auxiliary implements devices such as pitchforks, soil scoops, snow scoops, pole drills, and other accessories.

Figure 1:
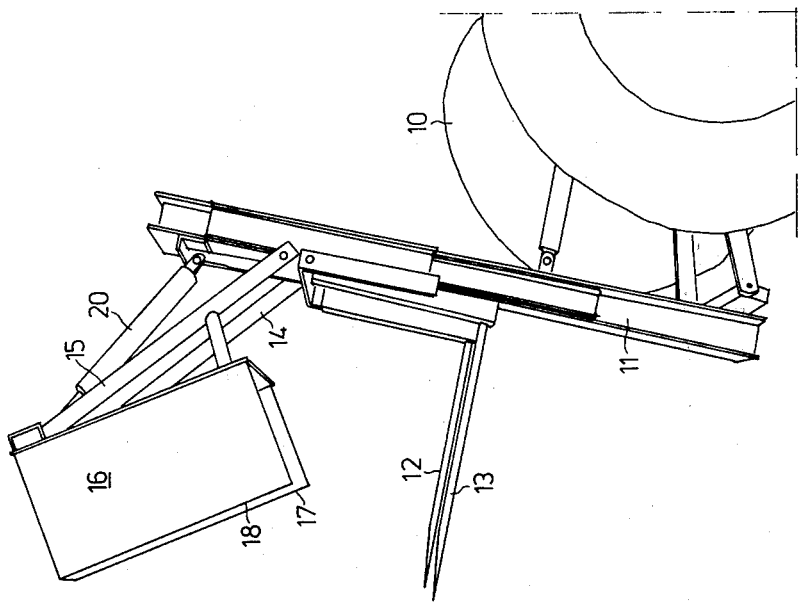
FIG. 1 is a perspective illustration of one embodiment of the invention.
Figure 6:
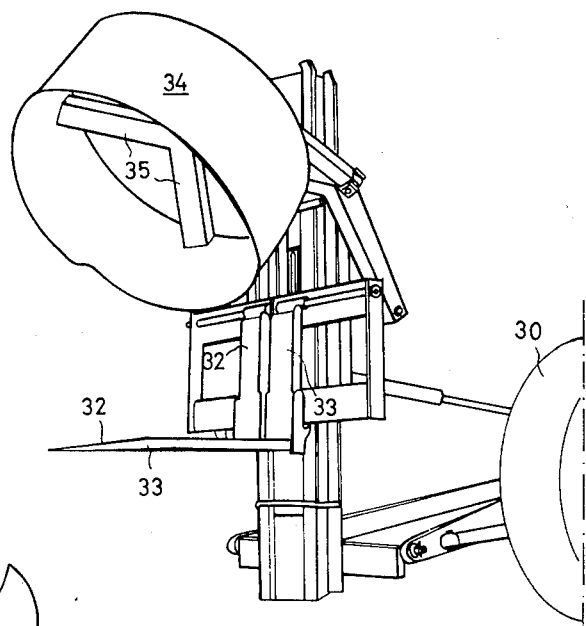
FIG. 6 is a perspective illustration of another embodiment of the invention.
Figure 7:
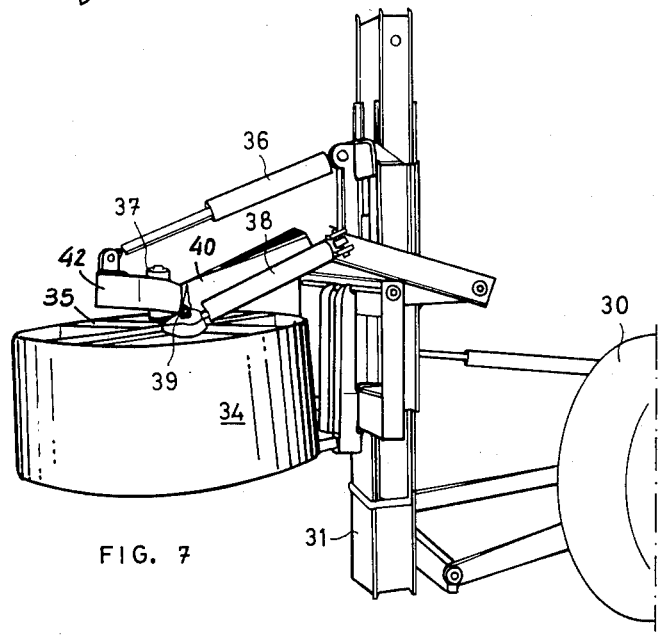
FIG. 7 shows the structure of FIG. 6 at the end of a cutting operation.

Referring now to FIGS. 6 and 7, in this embodiment there is also a prime mover in the form of an agricultural tractor 30 the rear of which is visible in FIGS. 6 and 7, in the same way that the rear portion of the tractor 10 is shown in FIGS. 1, 3, and 4. In this embodiment also the frame means or basic machine is in the form of a fork-lift device 31. It is to be understood, of course, that the apparatus of the invention may equally well be fixed to a body structure specifically designed for the purpose or the basic machine may be another type of machine, instead of a fork-lift device, such as a suitable front or rear loader. The fork lift device 31 is attached to the three-point lifting unit at the rear of the tractor 30, and the fork-lift device 31 may of course be vertical or inclined as desired. The fork-lift device 31 has the lifting prongs 32 and 33 which may have the construction of the prongs 12 and 13, with this construction being shown in detail in FIG. 8. In FIGS. 6 and 7 the prongs 32 and 33 are situated very close to each other so as to be almost in contact. These prongs 32 and 33 may be raised in a manner known in itself to a desired elevation.

In this embodiment the cutting means includes a wall structure in the form of a cylindrical wall unit 34 rather than a three-sided wall unit as shown in FIGS. 1-4, and this cylindrical wall 34 is operatively connected with the frame means 31. At its upper edge the wall 34 is connected with a crossed brace structure 35. An arm 40 is fixed to the bracing arms 35 and is pivoted with the frame means 31 while a central bearing structure 37 is fixed centrally to the bracing structure 35 to support the unit 34 for rotary movement with this bearing structure 37 being fixed to a bracket 42 which in turn is pivotally connected to one end of the expandable and contractable hydraulic unit 36 the opposite end of which is pivotally connected with the frame means 31. Thus, by way of the unit 36 it is possible to swing the wall 34 between the positions indicated in FIGS. 6 and 7 while at the same time the wall 34 is supported for rotation by way of the bearing structure 37. The axis of rotation provided by the bearing structure 37 coincides with the axis of the cylindrical wall 34.

The embodiment of FIGS. 6 and 7 is used primarily the same way as the embodiment of FIGS. 1-5. The only difference is that while the cutting unit 34 penetrates into the body of hay or the like, a rotary motion is imparted to the body 34, and its lower circular free edge is a cutting edge which slices into the body while penetrating into the same as a result of the rotary movement of the body 34 about its axis. While the body 34 can rotate in one direction it may also angularly oscillate about its axis while penetrating into the food. For this purpose, the bracing structure 35 is fixed with an arm 39 which is pivotally connected with a hydraulic unit 38 which in turn is pivotally connected with the frame means 31 in a manner apparent from FIGS. 6 and 7. Thus, by expanding the hydraulic unit 38 it is possible to turn the wall 34 in one direction about its axis and by contracting the unit 38 it is possible to turn the wall 34 in the opposite direction about its axis. Thus the hydraulic unit 38 is a double-acting piston-and-cylinder unit and during contraction and expansion thereof it acts on the lever arm 39 fixed to the cross-brace 35 of the unit 34 so as to rotate the latter in opposed directions.

Figure 9:
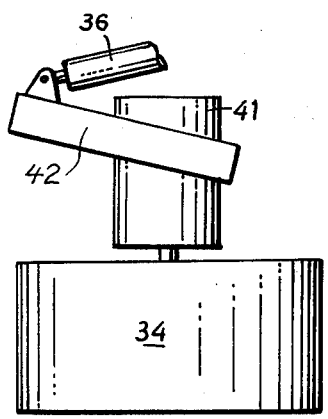
FIG. 9 illustrates a further embodiment.

Of course, if desired, the unit 34 may be rotated in one direction only, and for this purpose a construction as shown in FIG. 9 may be provided. Thus in this case the bracket 42 carries an electric motor 41 or the like which in turn directly carries the unit 34 so as to rotate the latter, this motor 41 being energized in any suitable way during the time that the unit 34 penetrates into the body of hay or the like.

While it is of course possible to provide a cutting unit 34 which is non-rotating, such a construction is not preferred because it will not achieve an efficient slicing action during cutting into the body.

Moreover, it is to be particularly emphasized that while in the illustrated embodiment the unit 34 swings downwardly and upwardly about a horizontal axis, such an arrangement is not essential and the support for the rotary unit 34 may be such that this unit simply moves in a straight up-and-down direction so that it enters the food mass from above and may be raised therefrom in the opposite vertical direction.

It is apparent, therefore, that there are many different ways in which the cutting unit 34 and the device such as the fork-lift device 31 may be structurally interconnected with each other. Moreover, the shape of the cutting unit 34 need not be circular. For example, this unit may have an elliptical configuration. Also the functional cooperation between the unit 34 and the basic machine such as the frame means 11 may be carried out in a number of different ways. In addition, the rotary or reciprocating motion of the unit 34 may be achieved in a number of other ways.

Figure 8:
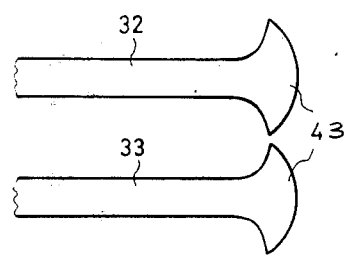
FIG. 8 illustrates details of prongs of the invention.

FIG. 8 shows an advantageous construction for the prongs 32 and 33, and of course the same construction is provided for the prongs 12 and 13. It will be noted that at their outer free ends 43, these prongs have arcuate cutting edges of a convex configuration extending along circles, for example, and as a result of this configuration of the cutting edges at the free ends of the prongs they will carry out a slicing cut while penetrating into the body of material to be situated beneath the cutting unit 16 or the cutting unit 34. It will thus be seen that at their free ends the prongs 32 and 33, or 12 and 13, have the configuration of a meat axe, but of course other shapes may be used as long as there is an efficient slicing cut of the prongs into the body beneath the unit 16 or 34.

It is thus apparent that with the structure of the invention the edible block of food which has been detached is removed from the larger body therof by way of a slicing cut on all sides so that the quality of the edible product will be maintained and substantially improved as compared with conventional detaching apparatus and methods.

It is thus apparent that by way of the apparatus of the invention it is possible to detach the food, such as hay, without risking rapid fermentation and deterioration of the food. It is furthermore possible with the apparatus of the invention to bring about the lifting of the detached portion of the body of food and transportation thereof to the feeding location, with these operations being carried out rapidly and without any strenuous manual labor.

The efficient operations which can be carried out with the structure of the invention enables silos and production premises to be designed in such a way that they comply with the unitary general lines. This is a considerable advantage from the viewpoint of political economy inasmuch as heretofore when mechanization of agricultural procedures were carried out, the practice has always been to construct an entirely new line of machines for each new application with the result that the costs have previously been prohibitive. In contrast, with the present invention the solution to the problem is brought about in an inexpensive manner inasmuch as use is made of machines already in existence in any event and capable of having the structure of the invention joined thereto.

Of course, only a few embodiments of the invention have been presented above. It will be obvious to those skilled in the art that numerous modifications are possible without going beyond the invention. In addition, the design of the structure of the invention may be utilized with basic machines other than those referred to above. Also the structure and design of the cutting unit proper may vary in its details within very wide limits.

I claim:

1. In an apparatus for detaching from a body of an edible material such as hay a portion of the body which after detachment can be transported to a desired location, a prime mover, frame means carried by said prime mover, and cutting means carried by said frame means for cutting into a body, such as a body of edible material, while carrying out a slicing stroke with respect to the body during penetration thereof, for detaching from said body a portion thereof, in the form of a block, which can then be transported to a desired location, said cutting means including a wall structure which terminates in cutting edges for cutting into the body while carrying out said slicing stroke with respect thereto, and said wall structure extending at least in part around said block and determining at least in part the configuration thereof.

2. The combination of claim 1 and wherein said cutting means is pivotally connected with said frame means.

3. In an apparatus for detaching from a body of an edible material such as hay a portion of the body which after detachment can be transported to a desired location, a prime mover, frame means carried by said prime mover, and cutting means carried by said frame means for cutting into a body, such as a body of edible material, while carrying out a slicing stroke with respect to the body during penetration thereof, for detaching from said body a portion thereof which can then be transported to a desired location, said cutting means having a pair of opposed lateral cutting edges and a front cutting edge extending between said lateral cutting edges.

4. The combination of claim 3 and wherein said front cutting edge has an irregular configuration.

5. The combination of claim 1 and wherein said cutting means is detachably connected with said frame means.

6. The combination of claim 1 and wherein said cutting means is rotatable in at least one direction with respect to said frame means.

7. The combination of claim 6 and wherein a hydraulic means is operatively connected with said cutting means for rotating the latter with respect to said frame means.

8. The combination of claim 6 and wherein a motor is operatively connected to said cutting means for rotating the latter.

9. The combination of claim 6 and wherein said cutting means has a portion connected to said frame means for rotation with respect thereto.

10. The combination of claim 1 and wherein said cutting means includes a hydraulic actuating means connected to a part of the cutting means and the frame means for actuating the cutting means.

11. The combination of claim 1 and wherein said frame means includes a fork-lift device.

12. The combination of claim 11 and wherein said fork-lift device is tiltable with respect to the prime mover.

13. The combination of claim 1 and wherein said prime mover has an end at which said frame means is located.

14. The combination of claim 11 and wherein said fork-lift device includes a pair of elongated prongs terminating in free cutting ends having cutting edges which slice into the body during penetration of the prongs into the same.

15. The combination of claim 1 and wherein said frame means is a fork-lift device having a pair of projecting prongs terminating in free cutting edges which have a configuration for slicing into a body of edible material or the like during penetration of the prongs into the body, said cutting means including said prongs and an upper wall of said wall structure pivotally connected to the fork-lift device for swinging movement downwardly toward and upwardly away from said prongs and a hydraulic means connected between said fork-lift device and wall for swinging the latter downwardly toward and upwardly away from said prongs, said wall having said cutting edges which slice into the body during movement of the wall downwardly toward said prongs.

16. The combination of claim 15 and wherein said wall has a pair of opposed sides and a transverse portion extending between said pair of opposed sides, and said opposed sides and transverse portion terminating in said cutting edges.

17. The combination of claim 15 and wherein said wall is circular and forms a cylinder having a free circular cutting edge directed toward said prongs, and means connected to said cylinder for turning the latter to provide the slicing action while the cylinder swings down toward said prongs.

* * * * *